March 29, 1927.
G. MAEHL
STONE DRESSING TOOL
Filed March 15, 1926
1,622,915
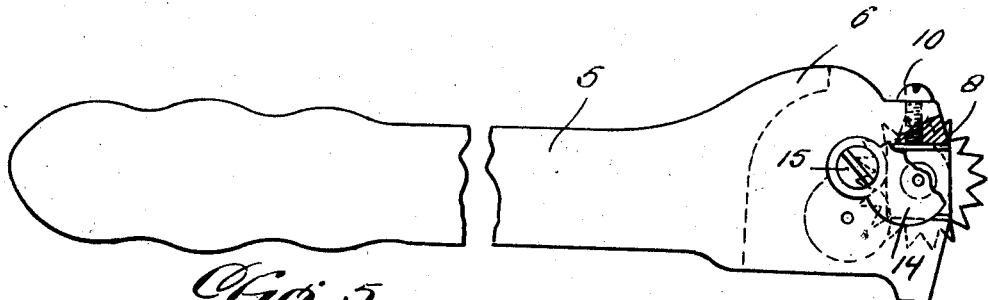
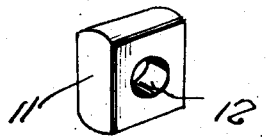
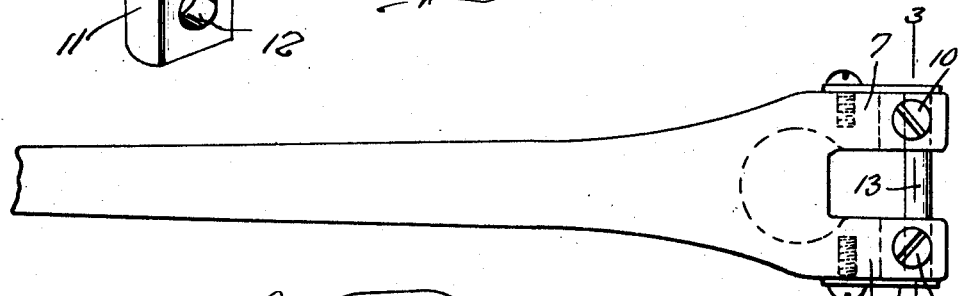
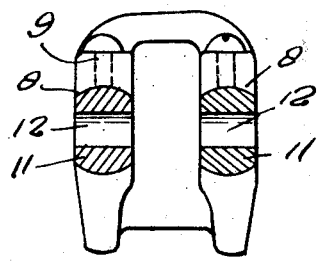
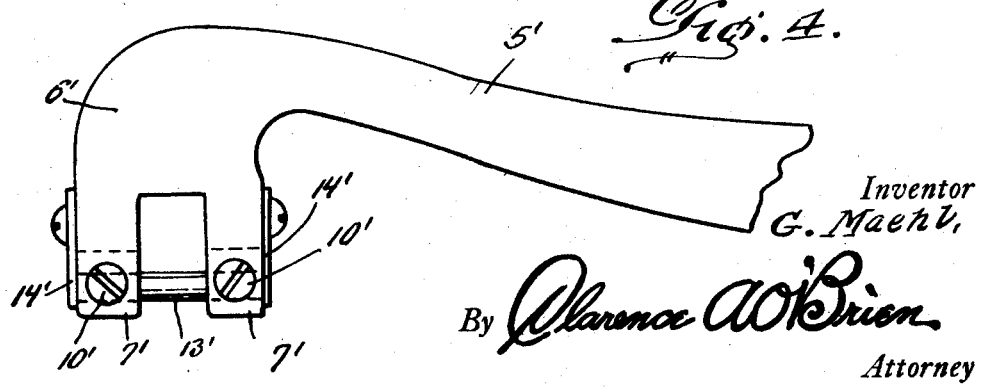
Inventor
G. Maehl,
By Clarence A. O'Brien
Attorney Patented Mar. 29, 1927.

1,622,915

UNITED STATES PATENT OFFICE.

GUS MAEHL, OF LOS ANGELES, CALIFORNIA.

STONE-DRESSING TOOL.

Application filed March 15, 1926. Serial No. 94,845.

This invention relates generally to stone dressing tools and has more particular reference to a removable bearing construction for the opposite ends of the usual dressing disk carrying shafts in order that said bearings may be quickly removed when worn and others substituted in lieu thereof for overcoming the requirement of discarding the entire tool which is now generally necessary in tools used for the dressing of grinding wheels, etc.

Other objects will become apparent as the nature of the invention will be better understood, the same comprising the novel form, combination and arrangement of parts hereinafter more fully described and shown in the accompanying drawing and claimed.

In the drawing:

Figure 1 is a side elevation of a conventional form of dressing tool, so constructed as to enable the use of my improved bearing construction for the opposite ends of the disk carrying shaft, Fig. 2 is a top plan view thereof, Fig. 3 is a front elevation, the bearings per se being disclosed in cross section, while the shaft and the disks mounted thereon are removed, and Fig. 4 is a top plan view of the front end of a slightly modified form of tool, also so constructed as to receive my improved bearing unit.

Fig. 5 is a perspective view of a bearing block.

First having reference to Figs. 1 to 3 inclusive, the tool includes a handle 5 and a head 6 that is forked to provide spaced tines 7—7. In carrying out my invention, said times are provided with square shaped openings 8 that are open to the forward edges of said tines as clearly shown in Fig. 1. The upper and lower edges of the openings are transversely concaved as clearly disclosed in Fig. 3, while directly above said opennigs the tines are provided with threaded openings 9 that enter the openings 8 and are adapted for receiving set screws 10.

Adapted to be removably disposed within said openings 8 of the tines 7—7 are bearing blocks 11—11 as more clearly disclosed in Fig. 5. These bearing blocks are of square shape as shown, and the upper and lower edges thereof are convexed transversely and are adapted to be slid into the openings 8—8, at the forward sides of the tines 7—7, the convexed surfaces thereof fitting into the concavities of the openings 8 in order that the blocks will be prevented from transverse movement therein.

Each block is formed centrally with an opening 12 for receiving the adjacent end of the cutter disk carrier shaft 13 which shaft is locked against side movement within the bearings by plates 14—14 that are swingably mounted upon the outer sides of the tines 7—7 through reason of pivot screws 15.

After the bearings have been disposed within the openings, 8—8, the screws 10—10 are turned downwardly for locking the same against longitudinal sliding movement therein. In the form of the invention shown in Fig. 4, the tool is so constructed as to permit of the dressing of the stones from the sides and in this instance the tool comprises a handle 5' and a head 6' bent at substantially right angles to the handle and being forked as shown for providing tines 7'—7'. In this instance also the forward edges of the tines, are provided with square-shaped openings for receiving bearings identical with the form of bearings shown in Fig. 5, while the same are secured within the openings through reason of set screws 10'—10'. In this instance also, the bearing blocks are to receive the opposite ends of a cutting disk carrying shaft 13' that is held against longitudinal movement within the bearings by swingably mounted retaining plates 14'—14'.

It will thus be seen that in both forms of tools disclosed in the drawings, that I have provided a highly novel bearing construction in order that after the bearings have become worn, they may be removed and replaced by others in a simple and expeditious manner, thus overcoming the necessity of entirely discarding the tool after the bearings have become worn.

Having thus described my invention, what I claim as new and desire to secure by Letters Patent is:—

A stone dressing tool comprising a body including a handle having a forked head at its outer end, the arms of the fork being provided with bearing block receiving notches opening through the outer ends of said arms, the upper and lower walls of said notches being curved transversely and spaced apart a distance greater than the thickness of the side walls of the fork, bearing blocks fitted into said recesses and having convex edges cooperating with the surface walls of said notches, a shaft extending between the forked arms and having its ends journaled for rotation in the bearing openings in said blocks, cover plates for the outer sides of the bearing openings in said blocks, and means for swingably connecting said plates with the arms of said head.

In testimony whereof I affix my signature.

GUS MAEHL.